Patented Sept. 27, 1932

1,880,058

UNITED STATES PATENT OFFICE

HAROLD P. VANNAH, OF WEST PALM BEACH, FLORIDA, ASSIGNOR TO BROWN COMPANY, OF BERLIN, NEW HAMPSHIRE, A CORPORATION OF MAINE

METHOD OF TREATING SOILS

No Drawing.    Application filed August 15, 1929. Serial No. 386,229.

This invention or discovery relates to the treatment of soils and more particularly those soils of a peat nature. There are large areas of land of which the Everglades regions of Florida is an example, which have heretofore been non-productive insofar as the growth of edible crops is concerned. Endeavors to raise crops of various kinds on cleared areas of these lands have resulted in monetary loss and disappointment. Various attempts have been made to ascertain the reason for the failure of crops. In some cases the failures have been due to a variety of causes. Such lands are usually rich in nitrogen and would appear to be fertile insofar as nitrogen is necessary to plant growth, but on the other hand the nitrogen is so distributed as to be injurious to plant growth. Again, the soil of the Everglades and particularly that of the sawgrass region, seems to be particularly suitable for the growth of destructive organisms of the character of fungi which have rendered futile the attempts to secure crop yields. One of the dangers, however, of treating the soil to secure immunity from such organisms, is that of destroying the benign or beneficent bacteria which are necessary for crop growth. While it is true, as has been pointed out in an application for Letters Patent by Arthur Frank and myself, that specific treatment is necessary for the elimination of and destruction of certain fungi such as Actinomyces scabies, yet such specific treatment may be necessary only for certain fungi and does not otherwise favorably affect the soil.

As a result of long continued experimental work both in raising crops of certain kinds and conducting researches into the nature of the soil and its constituents, I have discovered that it is possible, as I may call it, to amend the soil so as to make possible the growth of various crops with a productive yield. I have made the discovery that as a general rule if the soil be treated with zinc compound or with a mixture of the compounds of certain metals, particularly copper and zinc, it is possible to secure substantial immunity from the attack of many of the micro-organisms, without injury to the beneficial bacteria, and also to secure a luxuriant plant growth and a large yield of the crop when harvested. As illustrative of the crops that may be grown to advantage in such reclaimed areas treated as herein described, I may refer to solanaceous plants, e. g., potatoes, tomatoes and egg-plants; root crops, e. g., beets and the like; legumes, e. g., peanuts, beans, peas; and miscellaneous crops e. g., lettuce, cabbage, spinach, sugar cane, corn, etc.

In accordance with my invention or discovery, I treat the soil with a zinc compound or preferably with a mixture of the compounds of zinc and copper, as I have found that the results achieved by a mixture comprising these compounds are much better or greater than the results from the treatment of the soil with either. The selection of the particular compound depends upon its availability and its cost, for while better results are obtained by other compounds of these metals, nevertheless the cost thereof may be prohibitive. For example, while it is possible to employ the carbonate, hydroxide, oxide, sulfide or chloride of the metal, the sulfate may be successfully used and is ordinarily most available and can be obtained at cheaper cost. Whereas optimum results with particular crops might be obtained by the use of the hydroxides or chlorides of these metals, nevertheless, because of their cost or unavailability, it is more economical, all things considered, to use the sulfates. I have further observed that while excellent results are secured by mixtures of compounds of these metals, even better results are obtained with the soil mentioned by the further addition of an aluminum compound. Here again it may be that while certain compounds of aluminum may be more desirable in the point of cost, yet because of the better results that are obtained by one of the aluminum compounds, I preferably select aluminum chloride, even though it is higher in cost than the sulfate.

There are certain crops that may be grown to advantage in regions such as mentioned, where it is possible to utilize both the subsoil growth, as well as the foliage, such for example, as peanuts. In such case both the nuts and the vines are harvested, and it is desirable that the kernels should contain a maximum yield of oil and the foliage which contains a high percentage of protein should make a maximum yield of hay, inasmuch as it is available for use as cattle food. In checking against peanuts grown in the soil without the addition of the metallic compounds, I have found that the greatest yield, both as to oil and hay, is secured by the conditioning or treatment of the soil with a mixture of compounds of the three metals, copper, zinc and aluminum. The yield of oil is many times that of the oil derived from an untreated soil, and the hay yield is many times that of the content of the vines grown on untreated soil. In fact, unless the soil is treated, the yield both for the nuts and for the vines is negligible, due both to the presence of uncontrolled soil constituents and to the attack of micro-organisms. The content of oil in the nuts grown in the Everglades is on a par with that of nuts grown elsewhere, but the content of protein in the hay is greatly higher than that grown elsewhere. The metallic compounds do not affect the percentage of oil or protein but do increase the percentage per acre, both compared with untreated soil.

I have heretofore referred to the fact that the soil of the sawgrass region is rich in nitrogen. This nitrogen is in the form of certain proteins that are readily hydrolyzed. The addition of the compounds, more particularly those of copper, apparently has the effect of precipitating certain of the proteins and of controlling their action in promoting the plant growth. The soil proteins comprise amines, mono-amino acids and diamino acids. In soils of the type in question, the nitrogen of the above three forms is distributed in ratios of the three which are opposite to the ratios of productive soils, and are unfavorable to plant growth in these peat soils. By use of a copper compound a portion of the proteins of the diamino type which occur in such soils in disproportionate excesses are precipitated so that unavailability of their reactions against plant growth is secured; and, accordingly the peat soils become productive.

The function of the zinc compound is that of a stimulation of the chlorophyll activity of crops grown in these soils, whereby synthesis for nut and hay production may keep pace with the purely vegetative functions. I am unable to account for the beneficial results incident to the employment of aluminum. It may be that when the aluminum is utilized in the form of a chloride, because of its oxidizing action on the soil, unoxidized nitrogens are converted into nitrates, which add, of course, a food for the plant. The compounds also are destructive to many injurious micro-organisms which inhibit plant growth. The addition of these metal compounds may be summarized as effecting precipitation of the toxic proteins of the soil, a selective sterilization of the destructive micro-organisms, a control of nitrification and nitrogen feeding of the plant, and the alteration of the soil acidity by making base exchanges which bring the acid reaction of the soil close to neutrality.

By way of specific example, I may state that in preparing the sawgrass soil of the Everglades for peanuts, I make a thorough admixture of a compound of the metals zinc, copper and aluminum of, say, 12 lbs. $ZnSO_4$ (2 molecules of water), 50 lbs. $CuSO_4$ (crystalline, 5 molecules of water), and 60 lbs. $Al_2Cl_6$ (anhydrous). This furnishes a sufficient mixture for one acre. In preparing the mixture, a solution of the aluminum chloride, $(Al_2Cl_6)$, is preferably mixed with damp loose earth (so that it will flow freely from the container from which it is delivered by the spreading machine), and is then incorporated with the zinc and copper sulfates.

The foregoing method of admixing the aluminum chloride with earth has been found most suitable for its use. However, this compound may also be mixed with both or either of the other compounds mentioned before being applied to the soil. It is not necessary, however, that the three ingredients should be applied simultaneously in the form of a mixture, as the application of one to the soil may be followed by the separate application of one, or the others.

I may point out that in some cases it is possible to use the ores from which the copper and zinc are extractable, instead of the particular compounds which I have noted. Again, because they affect growth, there may either be added to the mixture of the compounds of zinc and copper, compounds of other metals, such as chromium, cadmium, manganese, molybdenum, magnesium, lead, nickel, potash and sulfur, either separately or in various admixtures. In selecting these materials there should, of course, be a suitable selection of the radical accompanying the metal. For instance, it is more desirable in the use of potash to employ potassium sulfide and in the case of nickel to employ the carbonate.

The mixtures of the metal compounds should preferably be applied to the soil several days in advance of the planting. The mixtures may be dissolved or suspended in an aqueous vehicle, or they may be distributed in the form of a dust or powder. For use in certain soils these various compounds of the metal may be admixed with fertilizers of various kinds and sold and shipped in bulk. For example, mixtures may be made of these compounds of the metals and any of the standard fertilizers,—ammonia, phosphoric acid, and potash,—so that the soil may be simultaneously provided with the proper nutritive elements for plant growth.

I have observed that the effect of the soil treatment is more or less permanent and that it is not essential, after once treating the soil, to treat it again until after a considerable period of time has elapsed. In fact, several crops may be successively harvested after the land has once been treated, before it is necessary to subject it to retreatment. It has been a matter of interest to note that after the soil has been prepared by the addition of $ZnSO_4$, and a crop grown thereon, it may be necessary only to treat the soil with $CuSO_4$, in order to secure the beneficial results of both treatments, for various crops thereafter, and that the zinc and copper additions may be reversed.

I have stated the advisibility of applying the metal compounds to the soil several days before planting, this being for the reason that thereby, the corrosive effect upon the seed is greatly reduced. However, I should not regard it as a departure from the present invention if, in substitution for the copper sulfate, one should employ a zinc-sulfate-calcic-lime combination, or a copper-sulfate-calcic-lime combination, wherein the corrosive effect of the zinc or copper sulfate is eliminated, or a magnesic lime be substituted for a calcic-lime.

The statements of the facts and theories herein advanced are predicated upon crops successfully grown on 1800 acres of the sawgrass soil of the Everglades. The preparations or mixtures were broadcast on the soil and in some instances the fields were then lightly harrowed so as to stir the chemicals into the top soil.

What I claim is:—

1. A process of conditioning soil of the character of the sawgrass soil occurring in the Everglades of Florida for the cultivation of plants therein, which comprises adding thereto a preparation containing the sulphates of zinc and copper, and the chloride of aluminum.

2. A process of conditioning soil of the character of the sawgrass soil occurring in the Everglades of Florida for the cultivation of plants therein, which comprises admixing aluminum chloride with loose, free-flowing earth, incorporating zinc and copper sulphates thereinto, and adding the resulting preparation to the soil.

In testimony whereof I have affixed my signature.

HAROLD P. VANNAH.